United States Patent [19]

Weimer et al.

[11] 4,104,454
[45] Aug. 1, 1978

[54] METHOD FOR REDUCING PVC POLYMER BUILDUP IN POLYMERIZATION REACTORS

[75] Inventors: Dean R. Weimer; Albert M. Durr, both of Ponca City, Okla.

[73] Assignee: Continental Oil Company, Ponca City, Okla.

[21] Appl. No.: 807,853

[22] Filed: Jun. 20, 1977

Related U.S. Application Data

[62] Division of Ser. No. 699,100, Jun. 23, 1976, Pat. No. 4,068,052.

[51] Int. Cl.$^2$ .............................................. C08F 10/60
[52] U.S. Cl. ..................................... 526/62; 526/344; 427/230
[58] Field of Search ................... 526/62, 74; 427/230; 252/652.5 P

[56] References Cited

U.S. PATENT DOCUMENTS

| | | | |
|---|---|---|---|
| 3,019,270 | 1/1962 | Hornbake | 260/652.5 P |
| 3,201,378 | 8/1965 | Ketterer | 526/62 |
| 3,669,946 | 6/1972 | Koyanagi | 526/62 |

*Primary Examiner*—Michael F. Esposito
*Assistant Examiner*—Sam Silverberg
*Attorney, Agent, or Firm*—Cortlan R. Schupbach, Jr.

[57] ABSTRACT

A method for preventing polymer buildup in the polymerization reactor during the suspension polymerization of vinyl chloride monomer to form polyvinyl chloride polymer and copolymers, the method comprising coating reactor surfaces in contact with the reaction medium with a material selected from the group consisting of alumina, dithiooxamide, and mixtures of these prior to carrying out this polymerization.

7 Claims, No Drawings

METHOD FOR REDUCING PVC POLYMER BUILDUP IN POLYMERIZATION REACTORS

This application is a divisional of application Ser. No. 699,100 filed Jun. 23, 1976, now U.S. Pat. No. 4,068,052.

This invention relates to a process for decreasing polymer buildup during suspension polymerization. More specifically, this invention relates to supressing the growth of polymer on reactor surfaces in contact with the reaction medium which results in reactor fouling during the reaction. The decrease is obtained by coating the reactor prior to the polymerization charge with alumina, dithiooxamide, or mixtures of these.

Reactor fouling during the polymerization of vinyl chloride polymers and copolymers has long been known as a severe problem in the art. Many methods have been attempted to overcome this problem. Among them are glass-lined reactors and reactors which are mirror smooth in finish in order to provide little purchase for polymerization adhesion. However, these methods have not been effective since eventually polymer buildup does occur in the reactor, which must be removed. When removal is by mechanical means, small scratches and imperfections are made on the reactor surfaces, forming sites for fouling to begin in subsequent polymerizations.

Reduction of fouling has been attempted for some materials by using reactors constructed of aluminum and then oxidizing the interior surface as described in U.S. Pat. No. 3,201,378. However, such a system is not useful for vinyl chloride polymerization, since such polymerizations produce HCl and can reach pH levels of 3 to 4. The HCl so produced will attack the aluminum reactor and cause it to become unsafe when subject to polymerization pressures. Such reactors are therefore not preferable over the conventional reactors made of materials such as stainless steel.

Another method of reducing such buildup has been the use of coating materials on the reactor surfaces. An example of such materials can be found in U.S. Pat. Nos. 3,926,910 and 3,669,946. These materials are usually sprayed or wiped on the reactor surface before charging, or added to the reactor medium shortly after polymerization has begun in order to prevent or reduce fouling at the reactor walls. These methods, however, have not been acceptable either because the amount fouling is reduced is not sufficient to provide a significant benefit, or if sufficient, modifications of the physical properties of the polymer which are not desirable have taken place.

It is therefore desirable that a method be devised to prevent reactor fouling and buildup without significantly altering the properties of the polymer while retaining the use of conventional reactors.

It is therefore an object of the instant invention to provide a method for reducing reactor fouling during the suspension polymerization of vinyl chloride monomer to form polymers and copolymers. Other objects will become apparent to those skilled in this art as the description proceeds.

It has now been discovered that small amounts of alumina, dithiooxamide, or a mixture of alumina and dithiooxamide will prevent reactor fouling or polymer buildup when introduced directly onto reactor surfaces in contact with the reaction medium prior to charging the reactor and carrying out the polymerization.

Alumina has been known and documented for coating various surfaces such as anti-slip agents for the paper industry and for use inside automatic dishwashers to sheet water more efficiently.

The aluminas useful in the instant invention are those which can be dispersed in water. An example of such alumina is DISPAL M, trademark of and sold by Continental Oil Company. In the practice of the instant invention, the alumina is placed in a dispersion suitable for wiping or spraying on reactor walls. Such a dispersion can be made by any of several known methods. Water is a useful solvent or water including acids such as hydrochloric, acetic, nitric, and chloroacetic can be used to disperse the alumina. Such dispersions can also be prepared using salts to disperse the alumina. Such salts are dry blended as a solid before dissolution or added to water prior to alumina. From about 0.1 percent to 50 percent by weight based on the weight of alumina of a salt compound is used. Representative examples of such dispersants are aluminum nitrate hydrate, ferric chloride, ferric chloride hexahydrate, soluble chromic chloride, chromic chloride hydrates, chromic nitrate hydrates, and ferric nitrate hydrates.

Dispersions can also contain materials such as acrylic polymers or small amounts of various surfactants. Basic materials such as sodium hydroxide or ammonium hydroxide can be added to the dispersion to raise the pH and increase the viscosity of the dispersions. Such increased viscosity gives better adherence to the reactor surfaces when operating, but poorer results were obtained with regard to reduction of fouling.

The alumina in the dispersion can vary from 1 to 20 weight percent with the preferred level being from about 3 to about 10 percent. The coverage on the reactor surfaces can vary from about 0.1 to about 5 grams alumina per square foot of reactor surface area with a preferred range being from about 0.25 to about 2 grams per square foot.

Dithiooxamides are also useful alone in the practice of the present invention much as is alumina. The dithiooxamide (also known as rubeanic acid) is dissolved in an organic solvent and sprayed on the reactor surfaces prior to polymerization. Representative examples of organic solvents useful are acetone, methanol, benzene, chloroform, and ethyl acetate.

The percent of dithiooxamide can vary from about 0.01 to about 4 grams per square foot reactor surface area with the preferred amount being from about 0.05 to about 3 grams per square foot. In addition to dithiooxamide alone, substituted dithiooxamides can also be utilized. Such materials have the general formula (I)

wherein R and R' are the same or different groups selected from the group consisting of 2-hydroxyethyl, carboxymethyl, benzyl, cyclohexyl, dodecyl, and methyl. Such substituted dithiooxamides can be used together with dithiooxamide, alone, in mixtures, or in combination with alumina to produce the benefits of the instant invention.

Representative examples of such substituted dithiooxamides are N,N'-bis(2-hydroxyethyl) dithiooxamide, N,N'-dibenzyl dithiooxamide, N,N'-didodecyl dithiooxamide, N,N'-dimethyl dithiooxamide, and N,N'-dicyclohexyl dithiooxamide.

It has also been discovered that a water dispersion of alumina and dithiooxamide applied to the reactor surface prior to charging the reactor and carrying out the polymerization almost completely eliminates vinyl chloride polymerization polymer buildup. The effect of the two in combination appears to be synergistic over the individual elements when used alone.

The dispersion is prepared by first making the alumina dispersion by known methods including the use of acids or salts as previously set forth. However, for the purposes of this invention, the preferred acid is hydrochloric or acetic. Dithiooxamide is then stirred into the alumina dispersion. Upon standing, dithiooxamide will separate from the mixture but is easily redispersed with stirring when use is desired.

Alumina can also be dispersed in an organic solvent preacidified with acids such as nitric and hydrochloric. Examples of suitable organic solvents are dimethylformamide, ethylene glycol, glycerol, methoxyethanol, methoxypolyethoxyethanol, and ethoxypolyethoxyethanol. If dithiooxamide is to be used, it can be added to the solvent by stirring after the alumina is dispersed.

The alumina content in the mixture can vary from about 1 to about 20 weight percent with the preferred level being from about 3 to 10 weight percent. The dithiooxamide content can vary from about 0.05 to about 5 weight percent with the preferred level being from about 0.1 to about 2 weight percent.

In the practice of the instant invention, application can be made to the reactor interior surfaces by any one of a number of known methods such as spraying, wiping, etc. One method would be to place a vacuum on the reactor when empty and then releasing the solution into the reactor, where it will immediately atomize into a fine dispersion and completely coat the interior surfaces. However, when spraying or wiping the solution on the reactor surfaces, any excess can be allowed to drain away. One feature of the instant invention is that the materials set forth herein cannot be added to the reactor ingredients and still prevent polymer buildup. It is essential that the reactor interior be completely coated prior to charging the reactor and carrying out the reaction.

The invention is more concretely described with reference to the following examples wherein all parts and percentages are by weight unless otherwise specified. The examples are designed to illustrate the instant invention and are not to be construed to limit it. Examples 1 through 6 are descriptive of the protection obtained when using alumina coating alone. Example 1 is a control using no alumina. Examples 2 through 5 show various methods of application. Example 6 shows the effect of adding alumina dispersion to the polymerization mixture.

EXAMPLE 1

Polymerization runs were made in an 8-gallon reactor using the formulation:

| | |
|---|---|
| Deionized water | 36 pounds |
| Methocel E15[1] | .115 parts per hundred monomer |
| Versene 100[2] | 6.1 grams |
| Benzotriazole | .18 grams |
| Lupersol 225M[3] initiator | 6.4 grams |
| Odorless mineral spirits | 15 grams |
| Vinyl chloride monomer | 20 pounds |

[1]Hydroxypropyl methyl cellulose, trademark of and sold by Dow Chemical Company.
[2]Tetrasodium salt of ethylenediamine tetraacetic acid, trademark of and sold by Dow Chemical Company.
[3]Di-(sec-butyl) peroxydicarbonate, trademark of and sold by Lucidol Division of Pennwalt Corp.

The coatings, when applied, were applied by spraying the interior reactor surfaces. After the coatings were applied, the deionized water, Methocel, Versene, benzotriazole, initiator, and OMS were charged to the reactor, then the reactor was sealed and evacuated for 15 minutes. Vinyl chloride was added and the reactor contents were heated to 130° F and maintained until the reactor pressure dropped to 90 psig (pounds per square inch gauge). At this point approximately 85 percent conversion of vinyl chloride to polyvinyl chloride had taken place. The reactor was then emptied and rinsed with water. The amount of buildup was rated from 0 to 10 with 0 being none and 10 being the buildup from a standard control run. No coating was used for the initial run, serving as a control base for the test runs.

EXAMPLE 2

A dispersion of DISPAL M alumina, trademarked and sold by Continental Oil Company was prepared using 94.2 grams of water, 0.8 grams of concentrated (37.5 percent) HCl, and 5 grams of alumina. The dispersion was wiped on the inner surfaces of the reactor and air dried. Aproximately 40 milliliters of the dispersion was used. After air drying, the reactor was lightly rinsed with water and charged for polymerization using the formulation of Example 1. The results are shown in Table I.

EXAMPLE 3

An alumina dispersion prepared by Philadelphia Quartz Company (Q-LOID A30) containing 20 to 25 percent DISPAL M alumina and a dispersion stabilizer, probably an acrylic monomer was wiped on the inner surfaces of the reactor. After air drying, the coating was lightly rinsed with water and the reactor charged for polymerization using the formulation described.

EXAMPLE 4

A dispersion was prepared using 472.5 grams of water, 1.5 grams of Sn Cl$_2$ . 2H$_2$O, 1 gram of concentrated HCl, and 25 grams of DISPAL M alumina. A dispersion was formed and an additional 1.25 grams of (NH$_4$)H$_2$PO$_4$ dissolved in 25 milliliters of water was added. The inner surfaces of the reactor were sprayed with approximately 80 milliliters of the dispersion. The excess runoff was removed from the reactor. The reactor was heated to 200° F for 30 minutes to dry the coating then cooled and charged for polymerization using the formulation described.

EXAMPLE 5

The procedure in Example 4 was exactly repeated except that the reactor was not heated to dry the walls after coating.

EXAMPLE 6

A polymerization was made in an uncoated reactor with 4 grams of the dispersion of Example 3 added to the polymerization charge. No reduction in buildup over the control run was obtained.

The results of all six examples are shown in Table I below.

TABLE I

| Example | Rating |
|---|---|
| 1 | 10 |
| 2 | 2 |
| 3 | 1 |
| 4 | 3 |
| 5 | 2 |
| 6 | 10 |

A series of reactions were carried out using dithiooxamide (rubeanic acid) in polymerizations utilizing the same formulation as described for the alumina dispersions set forth above. The reaction was carried out exactly as described heretofore with the baffle being removed and photographed after the reaction had taken place. The amount of buildup was rated 0 to 10 with 0 being no buildup and 10 being the amount of buildup obtained from a standard control run. Examples 7 through 12 were carried out within the above parameters using the following coatings.

EXAMPLE 7

No coating was used, the results serving as a control base for the following examples.

EXAMPLE 8

The reactor was sprayed with a mixture of 2 grams dithiooxamide and 100 milliliters methanol. The dithiooxamide was not completely soluble in methanol at this concentration so a cloudy solution resulted. The runoff was removed from the bottom of the reactor, the coating was air dried, and the reactor was charged for polymerization.

EXAMPLE 9

The procedures set forth in Example 2 was repeated using a solution of 1 gram dithiooxamide and 100 milliliters of methanol.

EXAMPLE 10

Prior to coating the reactor with a solution of 0.5 grams dithiooxamide and 100 milliliters of methanol, a portion of the baffle was covered with tape. After spraying the reactor and air drying, the tape was removed and the reactor was charged for polymerization.

EXAMPLE 11

The reactor was coated with a solution of 0.5 grams dithiooxamide in 100 milliliters of methanol and air dried. The reactor was charged for polymerization using the formulation given above except that no Versene 100 or benzotriazole was added.

EXAMPLE 12

A polymerization was made in an uncoated reactor with 0.22 grams dithiooxamide added to the polymerization charge. No reduction in buildup over the control run was noted. Thus dithiooxamide is not effective as an additive.

The results from Examples 7 through 12 as set forth above are shown in Table II below.

TABLE II

| Example | Rating |
|---|---|
| 7 | 10 |
| 8 | 1.5 |
| 9 | 1.5 |
| 10 | 1* |
| 11 | 3 |
| 12 | 10 |

*Portion of baffle covered by tape during coating gave a rating of 10.

Mixtures of dithiooxamide and alumina were also tested in the prevention of polymer buildup using the formulation set forth above. After the coating had been sprayed on the reactor, the Methocel E-15, Versene 100, benzotriazole, initiator, and odorless mineral spirits were charged to the reactor. The reactor was sealed and evacuated for 15 minutes. At this point the reactor surfaces were wet. Vinyl chloride was added and the reactor contents heated to 130° F and maintained at that temperature until the reactor pressure dropped to 90 pounds per square inch gauge. At this point approximately 85 pecent of the vinyl chloride had polymerized.

The reactor was emptied and rinsed with water. The baffle was removed and photographed. The buildup was rated from 0 to 10, 0 being no buildup and 10 being the amount of buildup from the standard control run.

EXAMPLE 13

No coating was used, the results serving as a control base for the following examples.

EXAMPLE 14

The coating used contained 5 weight percent DISPAL M alumina dispersed with hydrochloric acid, and 0.56 weight percent dithiooxamide.

EXAMPLE 15

The coating contained 5 weight percent DISPAL M alumina dispersed with hydrochloric acid and 0.25 weight percent dithiooxamide.

EXAMPLE 16

The coating contained 5 weight percent DISPAL M alumina dispersed with nitric acid and 0.25 weight percent dithiooxamide.

EXAMPLE 17

The coating contained 5 weight percent DISPAL M alumina dispersed with hydrochloric acid and 0.25 weight percent dithiooxamide. The polymerization charge contained no Versene 100.

EXAMPLE 18

The coating contained 5 weight percent DISPAL M alumina dispersed with hydrochloric acid and 0.25 weight percent dithiooxamide. The polymerization charge contained no Versene 100 or benzotriazole. Prior to coating the baffle, a portion was covered with tape. When the coating had been sprayed, the tape was removed leaving an uncoated area on the baffle.

EXAMPLE 19

The same coating as set forth in Example 15 was used, but the coating was dried before the polymerization charge was made.

The results of the polymerizations carried out above are shown in Table III.

TABLE III

| Example | Rating |
| --- | --- |
| 13 | 10 |
| 14 | <1 |
| 15 | <1 |
| 16 | 2-3 |
| 17 | <1 |
| 18 | 2-3* |
| 19 | 1 |

*On the uncoated portion of the baffle the rating was 10.

Polymerizations carried out in a 15-gallon reactor using the same coatings as used on the 8-gallon reactor yielded similar results. It has been found that the dispersion can be thickened by the addition of base to raise the pH. When ammonium hydroxide was added to increase the pH to 7, the thickened coating gave a rating of 2 to 3 on the same basis as set forth in Table III above. In a 75-gallon reactor, the coating was dry when the polymerization charge was added. The buildup was similar to that obtained in Example 19 above.

The synergistic properties of the coating solution prepared from a combination of alumina and dithiooxamide can be seen from a comparison of results from examples carried out in the same fashion.

| Example 2 (alumina) | Rating 2 |
| --- | --- |
| Example 10 (dithiooxamide) | Rating 1 |
| Example 14 (combination) | Rating <1 |

The results clearly show the unexpected beneficial result of combining both materials, although either alone give superior results.

A further scale up to an 1800-gallon capacity reactor using a formulation containing no benzotriazole and a coating similar to that of Example 15 above gave excellent results. The coating was dry at the time of the polymerization charge, and no benzotriazole was used in the formulation, so a small amount of buildup did occur. However, the buildup was very small compared to that obtained from uncoated runs. Both wet wall and dry wall results were carried out, with nearly equal results. Since wet wall reactions can take place faster and more economically, these are preferred.

As set forth above, it has been discovered that the ingredients of the instant invention must be added to the reactor walls prior to carrying out the polymerization. The ingredients of the instant invention are not effective when added to the reaction mixture as additives. Polymer buildup will occur in such instances.

The advantages of the process of the instant invention are immediately obvious. A simple spraying of the reactor wall will vastly decrease the amount of manual cleaning by solvent or scraping which is currently required in order to maintain reactor quality.

The physical properties of polymers produced by the methods of the instant invention were compared with those produced when no wall coatings were used. A representative battery of tests were carried out with the results shown in Table IV below.

Reactions were carried out in an 1800-gallon reactor using the following formulation:

| | |
| --- | --- |
| Water | 4867 pounds |
| Methocel F-50[1] | .055 phm* |
| Odorless Mineral Spirits (OMX) | .15 phm |
| Versene 100 | .07 phm |
| Lupersol L 223 M[2] | .052 phm |
| VCM | 4056 pounds |

[1]Hydroxypropyl methycellulose, trademark of and sold by Dow Chemical Company.
[2]Di-(2-ethylhexyl) peroxydicarbonate, trademark of and sold by Lucidol Division of Pennwalt Corporation.
*parts per hundred monomer, based on vinyl chloride monomer (VCM) charged.

The reactor was evacuated to 28 in Hg and charged with water, Methocel, Versene, and VCM. The mixture was heated to 120° F, when Lupersol and OMS were injected. The resulting mixture was then placed at 131° F to allow the polymerization to take place and terminated when 90 pounds per square inch gauge (psig) was reached.

Several test polymerizations were carried out, those numbered 20–24 being control runs with no inhibitor on the reactor surface, 26–30 having reactor walls coated with a formulation comprising 0.6 percent concentrated (37.5%) HCl, 5 percent DISPAL M alumina, and 0.25 percent dithiooxamide, and 32–36 having reactor walls coated with a formulation comprising 0.9 percent acetic acid, 5 percent DISPAL M alumina, and 0.25 percent dithiooxamide, all based on total weight of the coating formulation. Results numbered 25, 31, and 37 are averages of the five tests preceding.

The polymer so produced was evaluated using standard polymer tests. Brabender heat stability ratios were calculated as test sample value (minutes)/standard value (minutes). Gardner color results are defined as:

| L | 100 | = White | 0 | = Black |
| --- | --- | --- | --- | --- |
| A | — | = Green | + | = Red |
| B | — | = Blue | + | = Yellow |

All tests and procedures are well known to those skilled in this art. The results are shown in Table IV.

TABLE IV

| Pzn. No. | Bulk Density Lbs/ft³ | PARTICLE SIZE DISTRIBUTION | | | | | | | NO. OF GELS | | Dry Time Sec.³ | GARDNER COLOR | | | Contamination No. of Particles | Brabender Heat Stability Ratio |
|---|---|---|---|---|---|---|---|---|---|---|---|---|---|---|---|---|
| | | 40 | 60 | 80 | 100 | 140 | 200 | PAN | L¹ | S² | | L | A | B | | |
| 20 | 33.0 | 0.5 | 0.4 | 0.7 | 1.6 | 64.5 | 27.9 | 4.4 | 17 | 2 | 360 | 100.7 | −0.2 | 1.8 | 10 | 1.03 |
| 21 | 33.0 | 0.4 | 0.4 | 0.6 | 3.6 | 78.8 | 15.0 | 1.2 | 0 | 0 | 354 | 100.0 | −0.1 | 2.1 | 0 | 1.08 |
| 22 | 33.6 | 0 | 3.0 | 36.0 | 22.7 | 30.8 | 7.5 | 0 | 11 | 2 | 324 | 100.1 | −0.1 | 1.9 | 1 | 1.04 |
| 23 | 33.5 | 0 | 1.3 | 9.2 | 22.2 | 64.6 | 2.7 | 0 | 1 | 0 | 318 | 100.5 | 0 | 1.8 | 6 | 1.06 |
| 24 | 33.75 | 0.2 | 0.4 | 9.1 | 20.2 | 67.7 | 2.6 | 0 | 0 | 0 | 324 | 100.6 | −0.2 | 1.6 | 0 | 1.10 |
| 25 | 33.4 | 0 | 1.1 | 11.1 | 14.1 | 61.3 | 11.1 | 1.1 | 5.8 | .8 | 330 | 100.4 | −0.1 | 1.9 | 3.4 | 1.06 |
| 26 | 34.0 | 0 | 2.5 | 23.8 | 24.8 | 38.3 | 10.0 | 0.6 | 0 | 0 | 300 | 100.2 | 0.1 | 1.8 | 3 | 1.06 |
| 27 | 34.6 | 0 | 10.9 | 39.2 | 17.5 | 25.3 | 6.7 | 0.4 | 0 | 1 | 288 | 100.5 | 0.1 | 1.8 | 0 | 1.10 |
| 28 | 32.9 | 0 | 3.0 | 26.4 | 26.3 | 36.3 | 7.3 | 0.7 | 0 | 0 | 258 | 100.5 | 0.1 | 1.9 | 2 | 1.09 |
| 29 | 34.1 | 0 | 7.0 | 43.6 | 15.0 | 25.8 | 8.0 | 0.6 | 0 | 0 | 276 | 100.4 | 0.1 | 1.8 | 1 | 1.09 |
| 30 | 34.5 | 0 | 3.5 | 39.3 | 18.3 | 29.8 | 7.7 | 1.4 | 0 | 1 | 270 | 100.5 | 0.1 | 1.8 | 8 | 1.12 |
| 31 | 34.0 | 0 | 5.4 | 34.5 | 20.4 | 31.1 | 7.9 | 0.7 | 0 | 0 | 278 | 100.5 | 0.1 | 1.9 | 2.8 | 1.09 |
| 32 | 33.5 | 0 | 0.5 | 24.8 | 20.5 | 37.6 | 14.7 | 1.9 | 4 | .4 | 330 | 100.4 | −0.1 | 1.8 | 6 | 1.08 |
| 33 | 34.0 | 0 | 2.5 | 36.0 | 6.3 | 41.4 | 12.7 | 0.7 | 1 | 0 | 312 | 100.5 | −0.1 | 1.9 | 0 | 1.09 |
| 34 | 33.8 | 0 | 7.4 | 35.4 | 8.3 | 36.3 | 12.2 | 0.4 | 11 | 2 | 318 | 100.5 | −0.1 | 1.8 | 14 | 1.13 |
| 35 | 34.0 | 0 | 6.4 | 41.5 | 13.0 | 30.6 | 8.5 | 0 | 0 | 0 | 312 | 100.5 | 0 | 1.8 | 1 | 1.09 |
| 36 | 33.8 | 0 | 1.0 | 31.8 | 14.7 | 33.7 | 16.5 | 2.3 | 0 | 0 | 306 | 100.5 | −0.1 | 1.9 | 1 | 1.17 |
| 37 | 33.8 | 0 | 3.6 | 33.9 | 12.6 | 35.9 | 12.9 | 1.1 | 3.2 | .4 | 316 | 100.5 | −0.1 | 1.8 | 4.4 | 1.11 |

[1] Large
[2] Small
[3] Brabender

While certain embodiments and details have been shown for the purpose of illustrating this invention, it will be apparent to those skilled in this art that various changes and modification may be made herein without departing from the spirit or scope of the invention.

We claim:

1. In a suspension polymerization an improved method for preventing polymer buildup in the polymerization reactor during the polymerization of vinyl chloride monomer to form polyvinyl chloride polymer and copolymers, the improved method comprising coating reactor surfaces in contact with the reaction medium with dithiooxamide prior to carrying out the polymerization.

2. A method as described in claim 1 wherein the dithiooxamide is dissolved in a liquid.

3. A method as described in claim 2 wherein the liquid is an organic solvent.

4. A method as described in claim 3 wherein the organic solvent is selected from the group consisting of methanol, acetone, benzene, chloroform, ethyl acetate, or mixtures of these.

5. A method as described in claim 4 wherein the dried dithiooxamide is used at a level of from about 0.01 to about 4 grams per square foot on the reactor surface.

6. A method as described in claim 1 wherein the dithiooxamide has the general formula (I).

wherein R and R' are the same or different groups selected from the group consisting of 2-hydroxymethyl, carboxymethyl, benzyl, cyclohexyl, dodecyl, and methyl.

7. A method as described in claim 6 wherein a substituted dithiooxamide is used in mixtures with dithiooxamide.

* * * * *